United States Patent
Bellows et al.

(10) Patent No.: US 7,321,961 B2
(45) Date of Patent: Jan. 22, 2008

(54) METHOD AND APPARATUS TO AVOID COLLISIONS BETWEEN ROW ACTIVATE AND COLUMN READ OR COLUMN WRITE COMMANDS

(75) Inventors: Mark David Bellows, Rochester, MN (US); Ryan Abel Heckendorf, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/008,792

(22) Filed: Dec. 9, 2004

(65) Prior Publication Data

US 2006/0184754 A1 Aug. 17, 2006

(51) Int. Cl.
*G06F 12/00* (2006.01)
*G06F 13/00* (2006.01)
*G06F 13/28* (2006.01)

(52) U.S. Cl. .................. 711/167; 711/100; 711/168; 711/169

(58) Field of Classification Search ................ 711/104, 711/105, 154, 150, 167
See application file for complete search history.

(56) References Cited

U.S. PATENT DOCUMENTS

| | | | | |
|---|---|---|---|---|
| 5,818,751 | A * | 10/1998 | Ho et al. ................... | 365/154 |
| 6,272,608 | B1 * | 8/2001 | Ryan et al. ................. | 711/167 |
| 6,615,326 | B1 * | 9/2003 | Lin ........................... | 711/154 |
| 2001/0036116 | A1 * | 11/2001 | Kubo et al. ................ | 365/219 |
| 2005/0078506 | A1 * | 4/2005 | Rao et al. .................. | 365/154 |
| 2006/0039227 | A1 * | 2/2006 | Lai et al. ................... | 365/230.03 |

OTHER PUBLICATIONS

Davis et al., The New DRAM Interfaces: SDRAM, RDRAM and Variants, 2000, Lecture Notes in Computer Science, vol. 1940, pp. 26-31.*
ELPIDA, Jul. 10, 2003, Rambus, Toshiba and Elpida announce XDR DRAM, the worlds fastest memory, http:www.elpida.com/en/news/2003/07-10.html.*
Wolfram MathWorld, Odd Number, http://mathworld.wolfram.com/OddNumber.html.*
Shift Register Counters, Oct. 11, 1999, http://web.archive.org/web/19991011191710/http://www.eelab.usyd.edu.au/digital_tutorial/part2/register07.html.*

* cited by examiner

*Primary Examiner*—Hyung Sough
*Assistant Examiner*—Gary W Cygiel
(74) *Attorney, Agent, or Firm*—VanLeeuwen & VanLeeuwen; D'Ann N. Rifai (57) ABSTRACT

A method and apparatus to avoid collisions between row activate and column read or column write commands is presented. A memory controller includes control logic, activate allowed logic, and last column counter logic. The control logic sends particular values to the activate allowed logic and the last column counter logic at the beginning of a read or write operation, such as a new command load value, a read count value, and a write count value. In turn, the control logic receives an activate allowed signal from the activate allowed logic, which indicates the times at which a new activate command may be issued. As a result, the memory controller allows an activate command to commence on "even" command cycles or anytime after the last outstanding column command has been issued.

25 Claims, 7 Drawing Sheets

METHOD AND APPARATUS TO AVOID COLLISIONS BETWEEN ROW ACTIVATE AND COLUMN READ OR COLUMN WRITE COMMANDS

BACKGROUND OF THE INVENTION

1. Technical Field

The present invention relates in general to a method and apparatus to avoid collisions between row activate and column read or column write commands. More particularly, the present invention relates to a method and apparatus for initiating activate commands on "even" command cycles and initiating column commands on "odd" command cycles in order to avoid collisions in a high-speed chip-to-chip memory subsystem.

2. Description of the Related Art

Computer system developers constantly strive to increase a computer system's performance. The developers may focus on optimizing software components and/or hardware components in order to achieve this goal. One hardware optimization approach is to improve a processor's rate of reading from memory and writing to memory.

Hardware developers have designed a dynamic random access memory (DRAM) interface that includes a high-speed chip-to-chip data transfer technology. The interface technology may be implemented on standard CMOS DRAM memory cores and CMOS controller chips for applications such as high-performance main memory, PC graphics, game consoles, advanced digital consumer systems, high-performance networking systems, and other demanding applications requiring high-bandwidth memory subsystems.

The high-speed interface includes a command bus, which is used to send commands between a memory controller and the memory during read operations and write operations. A typical command sequence for either operation would be an "Activate" command, one or more "Column" commands, and a "Precharge" command. The activate command, also referred to as a row command, opens or senses a row or a page. The column command reads to or writes from a column within a row or page. And finally, the precharge command closes a row or a page.

A challenge found with existing art, however, is the possibility of activate commands colliding with column commands. A developer may use a strict time division multiplex (TDM) wheel to manage the timing between the two types of commands. However, this solution may reduce overall performance, which is in contrast to a computer developer's goals.

What is needed, therefore, is a method and apparatus to manage activate commands and column commands in order to avoid collisions with minimal impact on memory subsystem performance.

SUMMARY

It has been discovered that the aforementioned challenges are resolved using a system that includes logic that allows an activate command to commence on "even" command cycles or anytime after the last outstanding column command has been issued. A memory controller includes control logic, activate allowed logic, and last column counter logic. The control logic sends particular values to the activate allowed logic and the last column counter logic at the beginning of a read or write operation, such as a new command load value, a read count value, and a write count value. In turn, the control logic receives an activate allowed signal from the activate allowed logic, which indicates the times at which a new activate command may be issued. The invention described herein also provides a mechanism to adequately space activate commands.

The memory controller issues a new activate command, and the control logic sends a new command load value, which may be a four-bit value of "0001," to the activate allowed logic. The activate allowed logic loads the value into a four-bit shift register, whereby the most significant bit (MSB) of the shift register corresponds to an "activate allowed signal." When the value is loaded into the four-bit shift register, the activate allowed signal becomes low, which prevents the control logic from issuing subsequent activate commands until the activate allowed signal is high (true). For example, using a four-bit value of "0001," the MSB becomes high (e.g., "1000") after four command cycles. In one embodiment, the activate allowed logic may operate in reverse such that the least significant bit (LSB) corresponds to the "activate allowed signal."

In addition, the control logic provides either a read count value or a write count value to the last column counter logic, depending on whether the activate command corresponds to a read operation or a write operation. The last column counter logic loads the value into a four-bit register, and is responsible for tracking the point at which the last outstanding column command completes.

On each command cycle, the activate allowed logic's shift register "shifts" the loaded value. When the shift register value reaches "1000," the activate allowed signal becomes true which, in turn, informs the control logic that it may initiate a new activate command. If a new activate command is ready for issue, the control logic provides a new command load value to the activate allowed logic which thus, resets the activate allowed signal.

However, if a second activate command is not ready to be initiated, on the next command cycle, the MSB is shifted to the LSB, and the bit prior to the MSB is set to "1," resulting in a value of "0101." Subsequent command cycles result in shift register values of 1010, 0101, 1010, 0101, etc. As can be seen, the activate allowed signal (i.e. MSB) is true on "even" command cycles, which results in the control logic being able to issue new activate commands on "even" command cycles and thus, avoiding column commands that may be issued on "odd" command cycles.

In addition to the activate allowed logic performing actions on each command cycle, the last column counter logic also performs actions on each command cycle. The last column counter logic decrements its register's value on each command cycle, and when the register's value reaches zero, a "column commands complete signal" is set to true, which indicates that the last outstanding column command is complete. When the activate allowed logic detects that the column commands complete signal is true, the activate allowed logic sets its latches to "1111," which keeps the activate allowed signal true until a new activate command is issued.

In one embodiment, the activate allowed logic, the last column counter logic, or both, may be implemented in a subroutine, such as in software or firmware. In another embodiment, the memory may be comprised of extreme Data Rate (XDR™) DRAMs. In this embodiment, the memory controller includes an XDR™ IO Cell (XIO™) interface that communicates with the command and data buses.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
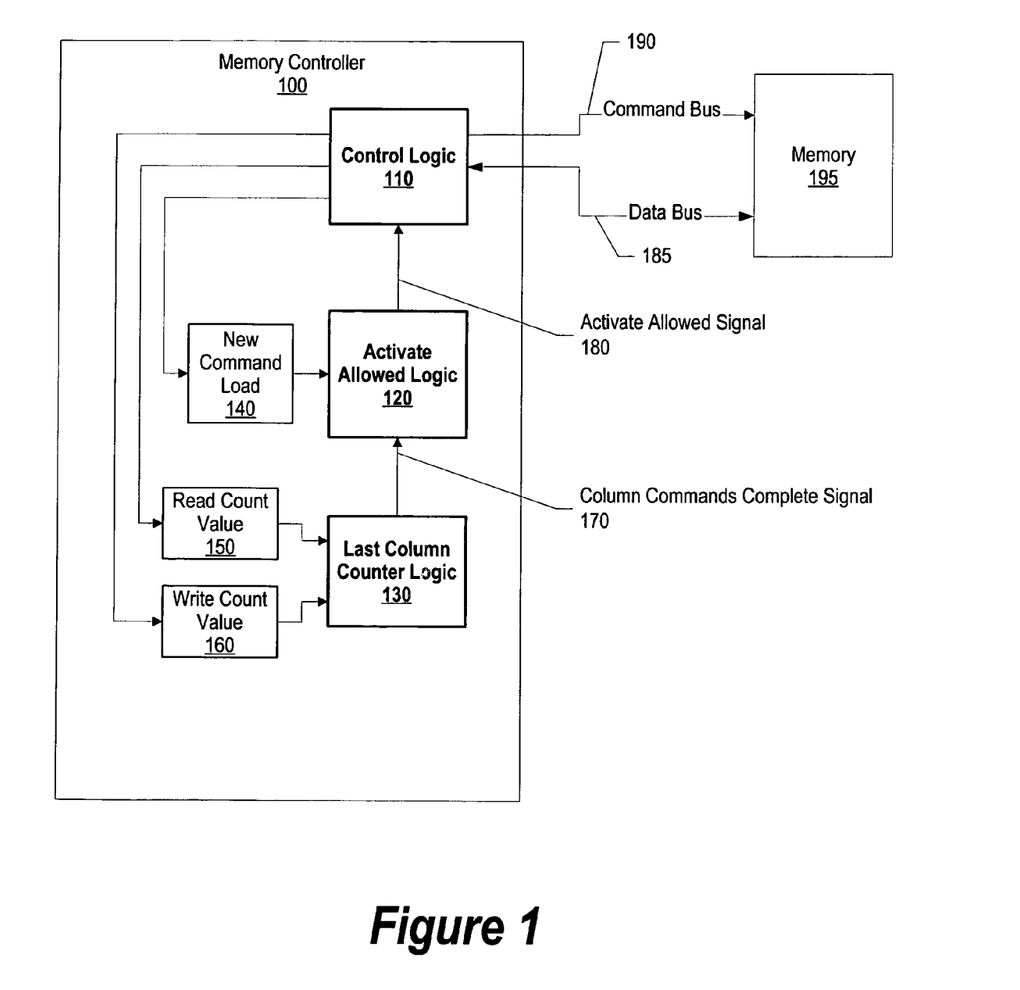
FIG. 1 is a diagram showing a memory controller that manages row activate and column read or column write commands.

FIG. 1 is a diagram showing a memory controller that manages row activate and column read or column write commands. Memory controller 100 issues commands to memory 195 over command bus 190. Particular commands that are sent over command bus 190 include "Activate" commands, "Column" commands, and "Precharge" commands. Other commands may be issued over this bus but do not interfere with the stream of commands described in the present invention. An activate command signifies the beginning of a read or write operation. A column command may occur on "odd" command cycles relative to an activate command, and determines the time at which data is sent to or received from memory 195. A precharge command signifies the end of a particular read or write operation. For example, a read operation may include the following sequence of commands: "activate," "column," "column," "precharge." Data bus 185 is a bi-directional bus and is used for memory controller 100 to send/receive data to/from memory 195.

In one embodiment, memory 195 is an Extreme Data Rate (XDR) DRAM, and command bus 190 and data bus 185 are configured to communicate with the XDR DRAM. In this embodiment, memory controller 100 includes an XIO macro that communicates with command bus 190 and data bus 185. The XIO interface includes necessary I/O circuitry to send the commands and data over to the XDR DRAM and to capture read data. It also includes control circuitry for calibrating the memory channel.

Memory controller 100 includes control logic 110, activate allowed logic 120, and last column counter logic 130. Control logic 110 sends particular values to activate allowed logic 120 and last column counter logic 130 at the beginning of a read or write operation, such as new command load 140, read count value 150, and write count value 160. In addition, control logic 110 receives activate allowed signal 180 from activate allowed logic 120, which signifies when a new activate command may be issued.

When memory controller 100 issues an activate command, control logic 110 sends new command load 140 to activate allowed logic 120. New command load 140 is a four-bit value of "0001," which is loaded into a four-bit shift register that is included in activate allowed logic 120 (see FIG. 3 and corresponding text for further details regarding the four-bit shift register). At this time, activate allowed logic 120 resets activate allowed signal 180 to "0," which prevents control logic 110 from issuing subsequent activate commands until activate allowed signal 180 is set to true. The value "0001" keeps the activate commands from issuing too close together.

Activate allowed logic 120 shifts the loaded value on each command cycle, until the value reaches "1000." The most significant bit (MSB) of the shift register corresponds to activate allowed signal 180 and, therefore, when the value reaches "1000," activate allowed signal 180 becomes true. This informs control logic 110 that it may initiate a new activate command. If a new activate command is ready to be issued, control logic 110 provides new command load 140 to activate allowed logic 120 and thus, resets activate allowed signal 180.

However, if a second activate command is not ready to be initiated on the next command cycle, the MSB is shifted to the LSB, and the bit prior to the MSB is set to "1," resulting in a value of "0101." Subsequent command cycles result in shift register values of 1010, 0101, 1010, 0101, etc. As can be seen in more detail in FIG. 4, activate allowed signal 180 is true on "even" cycles, which results in control logic 110 being able to issue new activate commands on "even" cycles and thus, avoiding column commands that are issued on "odd" command cycles.

When a new activate command is issued, the activate command's corresponding column commands end at a particular time. Once the column commands end, control logic 110 is able to issue a new activate command at any time. Last column counter logic 130 is responsible for tracking the point at which each outstanding column command is complete. Typically, this means the point at which the last activate command's corresponding column commands are complete. When control logic 110 issues an activate command, control logic 110 provides either read count value 150 or write count value 160 to last column counter logic 130, depending on whether the activate command corresponds to a read operation or a write operation. Last column counter logic 130 loads one of the values into a read or write register, and decrements the register's value on each command cycle.

Figure 2:
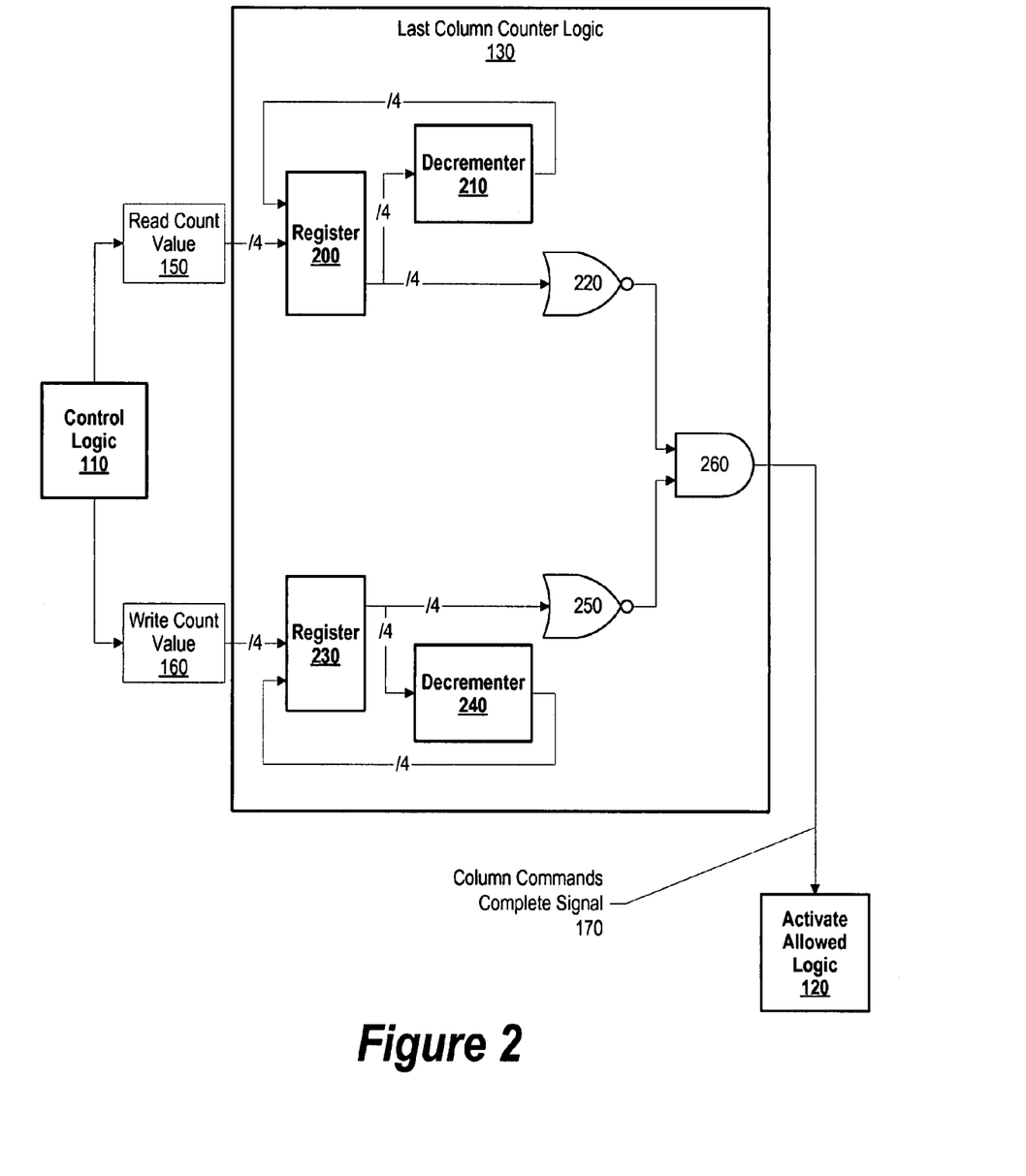
FIG. 2 is a diagram showing logic that determines when a last outstanding column command is complete.

When the register value is zero, it signifies that each of the activate command's corresponding column commands is complete, and column commands complete signal 170 is set to true (see FIG. 2 and corresponding text for further details regarding last column counter logic specifics). When activate allowed logic 120 detects that column commands complete signal 170 is true, activate allowed logic 120 sets its latches to "1111", which keeps activate allowed signal 180 true until a new activate command is issued.

FIG. 2 is a diagram showing logic that determines when a last outstanding column command is complete. Last column counter logic 130 is the same as that shown in FIG. 1, and includes column read command counting logic and column write command counting logic. Register 200, decrementer 210, and gate 220 constitute the column read command counting logic, which last column counter 130 uses to detect when the last outstanding column read command is finished. Register 230, decrementer 240, and gate 250 constitute the column write command counting logic, which last column counter 130 uses to detect when a last outstanding column write command is finished.

Upon initialization, registers 200 and 230 are set to "0." The four-bit output (all 0's) of register 200 is an input to gate 220. Since gate 220 is a NOR gate, the output of gate 220 is "1," which is also one of the inputs to gate 260. In addition, since register 230 is set to "0," the four-bit output of register 230 (all 0's) is an input to gate 250 and thus, the output of gate 250 is "1." Gate 250's output is the second input to gate 260. Since gate 260 is an AND gate, and both inputs are "1," gate 260's output is also "1," which is column commands complete signal 170. This signal is an input to activate allowed logic 120 which signifies that an activate command may be issued on any command cycle. Column commands complete signal 170 is the same as that shown in FIG. 1.

When an activate command is issued, control logic 110 provides read count value 150 to last column counter logic 130 if the activate command corresponds to a read operation, or provides write count value 160 to last column counter logic 130 if the activate command corresponds to a write operation. For the sake of simplicity, the following describes the process in which last column counter logic 130 uses register 200, decrementer 210, and gate 220 to track a read operation. As those skilled in the art can appreciate, last column counter logic 130 uses register 230, decrementer 240, and gate 250 in a similar manner to track a write operation. Control logic 110, read count value 150, and write count value 160 are the same as that shown in FIG. 1.

Last column counter 130 receives read count value 150 and loads the value into register 200. For example, the value may be "7" which signifies that the last column command is complete in seven command cycles. Register 200 outputs this value to decrementer 210 and gate 220. Since the input of gate 220 is now not all "0's," the output of gate 220 is "0" and thus, column commands complete signal 170 is reset to "0."

Decrementer 210 decrements on each command cycle until decrementer 210 reaches "0." Decrementer 210's output is fed back to the input of register 200, so the output of register 200 decreases on each command cycle until its output is "0." When register 200's output is all "0's," gate 220's output is "1" and column commands complete signal 170 is true. If a new activate command is issued before decrementer 210 decrements to zero, last column counter logic 130 is reloaded with a new read count value or write count value.

Figure 3:
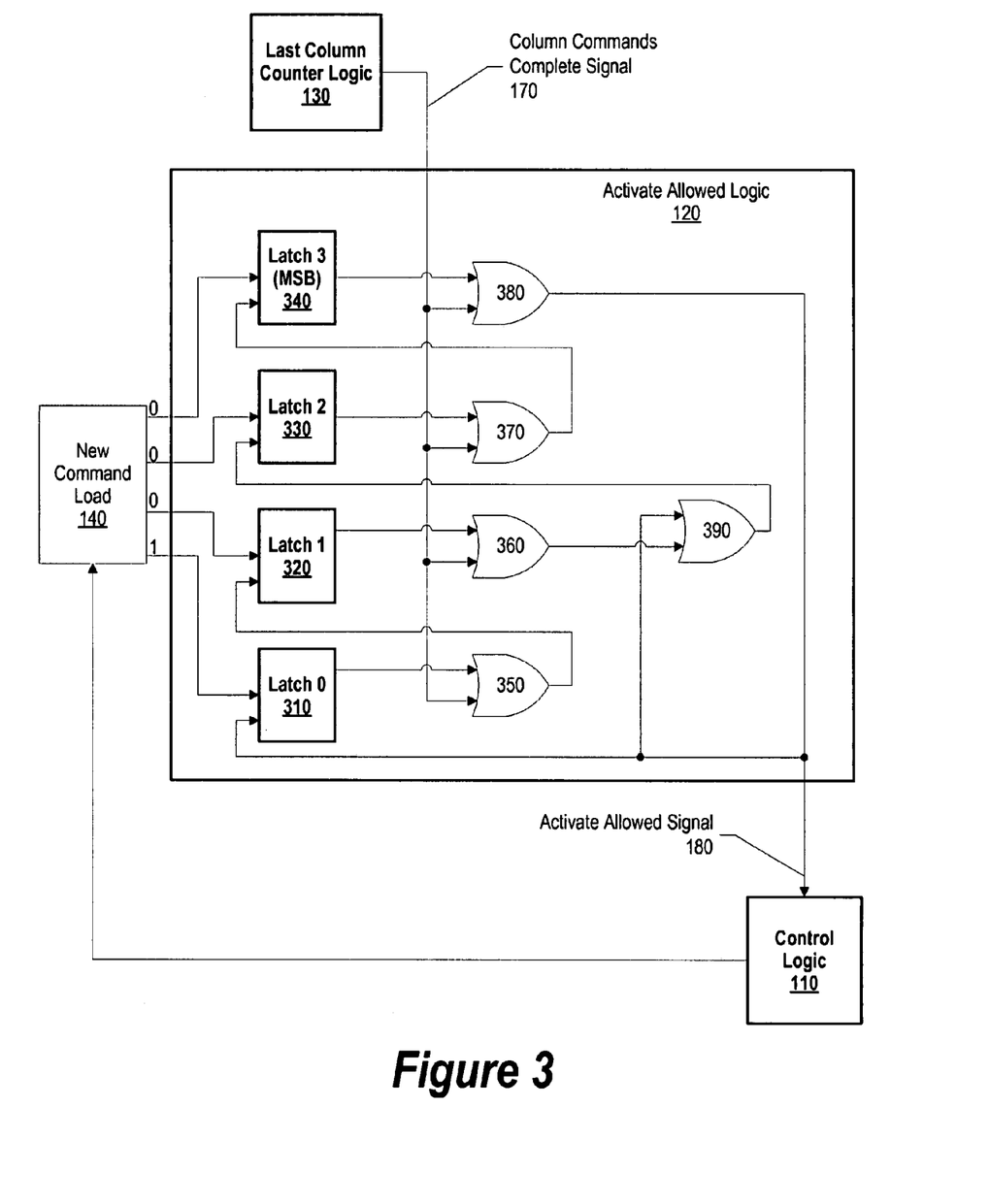
FIG. 3 is a diagram showing logic that determines when a new activate command may be issued.

FIG. 3 is a diagram showing logic that determines when a new activate command may be issued. Activate allowed logic 120 informs control logic 110 as to allowable times to initiate a new activate command by setting activate allowed signal 180 to true. Activate allowed logic 120, activate allowed signal 180, and control logic 110 are the same as that shown in FIG. 1.

Upon initialization, since column commands complete signal 170 is true, the hardware loads "1111" into latches 310 through 340. The output of latches 310 through 340 are input to gates 350 through 380, respectively. Activate allowed signal 180 is the output of gate 380, and since latch 3 340's output is "1," the output of gate 380 is "1" and, therefore, activate allowed signal 180 is true, signifying that a new activate command may be issued on any command cycle.

When control logic 110 issues an activate command, control logic 110 provides new command load 140 to activate allowed logic 120. New command load 140 is "0001," whereby "1" is loaded into latch 0 310, and "0's" are loaded into latch 1 320, latch 2 330, and latch 3 340. Control logic 110 also sends a read count value or write count value to last column counter 130, thus resetting column commands complete signal 170 to "0." Therefore, since column commands complete signal 170 and the output of latch 3 340 are both zero, gate 380's output is "0," and thus, activate allowed signal 180 is "0." New command load 140 and last column counter logic 130 are the same as that shown in FIG. 1.

On the next command cycle, gate 350's output is input to latch 1 320, gate 360's output is input to gate 390 whose output is input to latch 2 330, gate 370's output is input to latch 3 340, and gate 380's output is input to latch 0 310. Therefore, the value of "0001" is shifted to result in "0010." For the next two command cycles, the latch values shift to "0100" and "1000." When the value reaches "1000," the output of latch 3 340 is "1," which changes gate 380's output to "1" (i.e. activate allowed signal 180), informing control logic 110 that it is allowed to issue another new activate command.

On the next command cycle, since the output of gate 380 is input to gate 390 and latch 0 310, the latch values become "0101," thereby resetting activate allowed signal 180 to "0." Activate allowed logic 120 is designed such that, once its latches reach "1000," the values toggle between "0101" and "1010," which toggles activate allowed signal 180. As a result, control logic 110 is allowed to issue an activate command on every other command cycle (i.e. "even" command cycles).

When last column counter logic 130 determines that the last outstanding column command is complete, column commands complete signal 170 is set to true. This forces the output of gates 350 through 380 to "1," thereby reloading a value of "1111" into latches 310 through 340. The latches stay at "1111" until activate allowed logic 120 receives a new command load from control logic 110.

Figure 4:
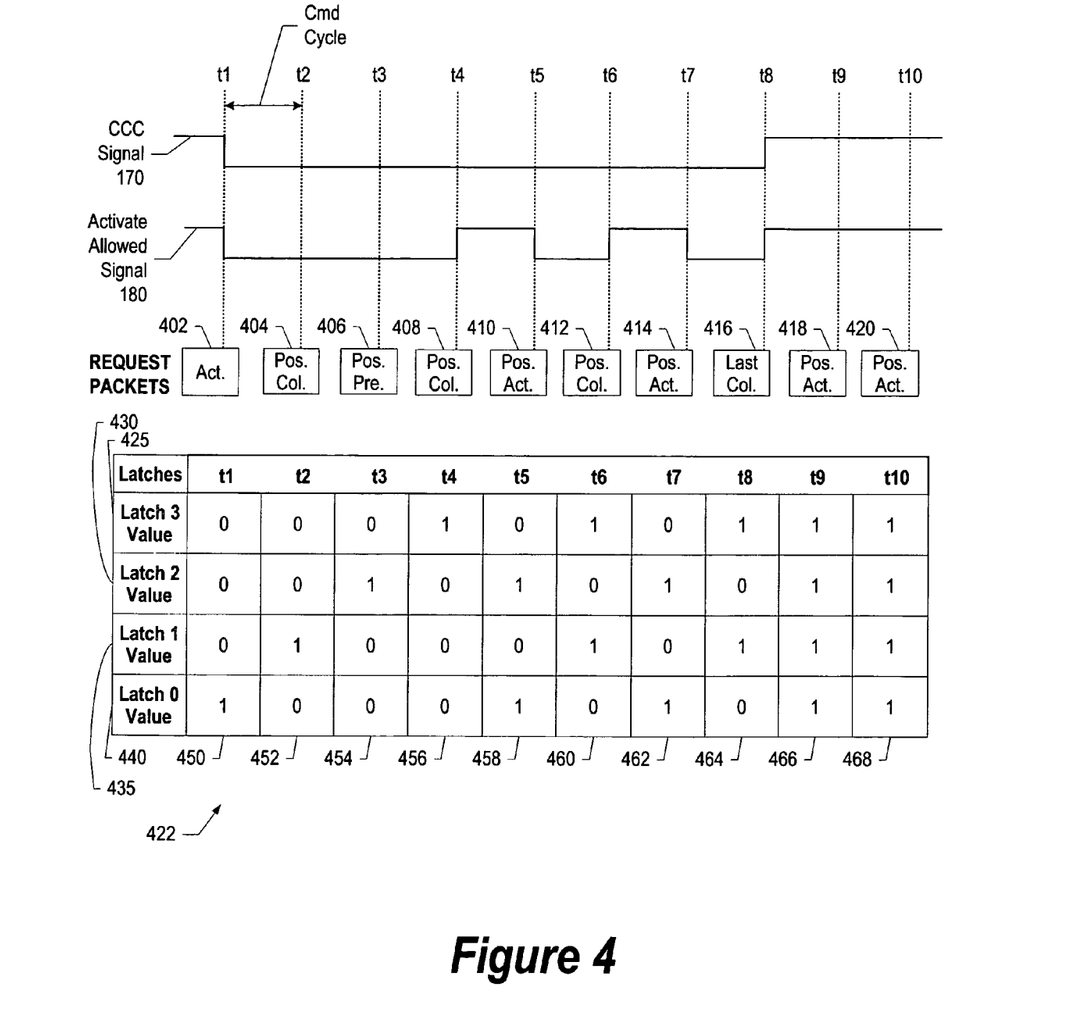
FIG. 4 is a diagram showing activate allowed logic latch values, signal values, and possible request packets at particular times.

FIG. 4 is a diagram showing activate allowed logic latch values, signal values, and possible request packets at particular times. Activate allowed logic 120 and last column counter logic 130 (both shown in FIG. 1) identify command cycle times to allow a new activate command. Column commands complete signal 170 and activate allowed signal 180 are the same as that shown in FIG. 1. Rows 425 through 440 correspond to the output values of latches 340 through 310, respectively, which are shown in FIG. 3. The value of row 425 corresponds to the state of activate allowed signal 180.

At time t1, control logic issues activate packet 402. At this time, the control logic also provides a read count value or write count value to the last column counter logic and thus, column command complete signal 170 is reset low. In addition, at time t1, the control logic loads a new command load of "0001" into the activate allowed logic and thus, the values of rows 425 through 440, respectively, are "0001" (column 450), which forces activate allowed signal 180 low.

At time t2, the control logic may issue possible column command 404. In addition, the values of rows 425 through 440, respectively, are shifted to "0010" as shown in column 452. At time t3, the control logic may issue possible precharge command 406, and the values of rows 425 through 440, respectively, are shifted to "0100" as shown in column 454. At time t4, the control logic may issue possible column command 408 and the values of rows 425 through 440, respectively, are shifted to "1000" as shown in column 456. Thus, activate allowed signal 180 is set to true, which informs the control logic that a new activate command (e.g. possible activate command 410) may be issued on the next command cycle.

At time t5, the control logic may issue possible activate command 410 because activate allowed signal 180 became true at time t4. In addition at time t5, the values of rows 425 through 440, respectively, are reconfigured to "0101," respectively, as shown in column 458 (see FIG. 3 and corresponding text for further details regarding latch value reconfiguration). Since the value of row 425 is zero at time t5, activate allowed signal 180 is reset to zero.

At time t6, the control logic may issue possible column command 412 and the values of rows 425 through 440, respectively, are shifted to "1010" as shown in column 460 and thus, activate allowed signal 180 is set to true. At time t7, the control logic may issue possible activate command 414 because activate allowed signal 180 became true at time t6. In addition at time t7, the values of rows 425 through 440, respectively, are shifted to "0101," respectively, as shown in column 462, which forces activate allowed signal 180 low.

At time t8, the control logic may issue last column command 416. Last column command 416 is the last outstanding column command. In addition, the values of rows 425 through 440, respectively, are shifted to "1010" as shown in column 464 and thus, activate allowed signal 180 is set to true.

Last column counter logic tracks the timing of last column command 416. Thus, the last column counter logic changes column command complete signal 170 to "true" once the last column command completes. This signifies that the control logic may issue a new activate command, such as possible activate commands 418 and 420 at any subsequent command cycle, such as time t9 and t10, respectively. In addition, when column command complete signal 170 is true, the value of rows 425 through 440 are set to "1111" as shown in columns 466 and 468 and, therefore, activate allowed signal 180 becomes true until the control logic issues another activate command signal (see FIG. 3 and corresponding text for further details regarding latch value setting).

Figure 5:
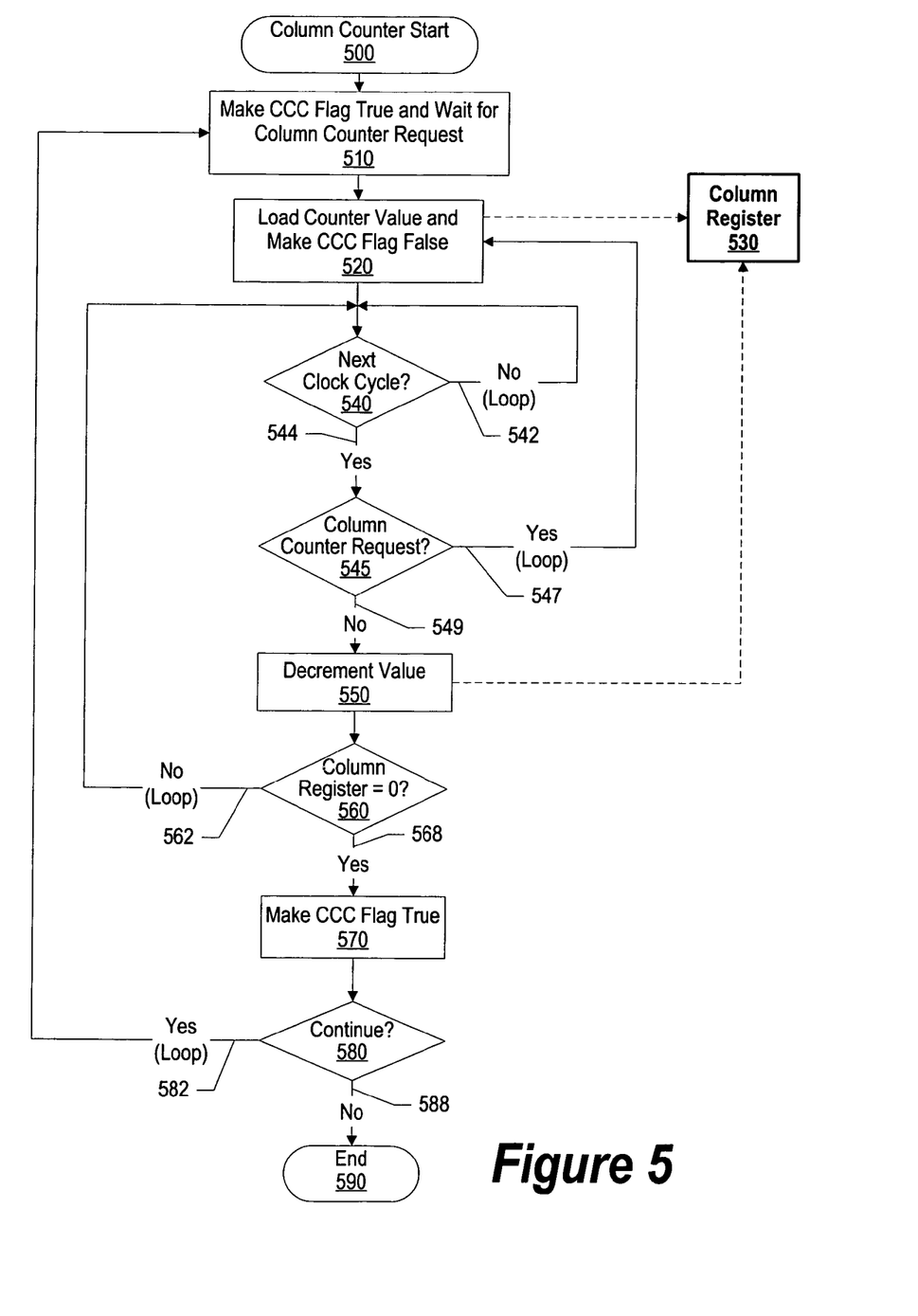
FIG. 5 is a flowchart showing steps taken in determining when a last column command that corresponds to an activate command is complete.

FIG. 5 is a flowchart showing steps taken in determining when a last column command that corresponds to an activate command is complete. FIG. 5 is a flowchart of a non-hardware implementation (e.g., software or firmware) of last column counter logic 130 that is shown in FIG. 1.

Processing commences at 500, whereupon processing waits for a column counter request (step 510). During this time, a column command complete flag is set to true because there are no active column commands. The column command complete flag informs activate allowed logic or subroutine that a last column command is complete, and that a new activate command may be issued at any time. The column counter request may come from control logic or control software that is included in a memory controller. At step 520, processing loads a counter value in column register 530 that corresponds to the time at which the last outstanding column command is complete, and the column command complete flag is set to false. The counter value may correspond to a read operation or a write operation. Column register 530 may be stored in a volatile memory area, such as computer memory.

A determination is made as to whether a next command cycle occurs (decision 540). Processing uses the command cycle to synchronize its counting with times at which a column command may be issued. If a next command cycle did not occur, processing branches to "No" branch 542 whereupon processing loops back to wait for the next command cycle. This looping continues until a command cycle occurs, at which point decision 540 branches to "Yes" branch 544.

A determination is made as to whether a new column counter request was requested (decision 545). If a new column counter request was requested, processing branches to "Yes" branch 547, which loops back to load a new counter value. On the other hand, if a new column counter request was not requested, decision 545 branches to "No" branch 549 whereupon processing decrements the value in column register 530 (step 550). For example, if processing originally loaded a value of "7" in column register 530, processing decrements the value to "6."

A determination is made as to whether the value in column register 530 is zero, which signifies that the last outstanding column command is complete (decision 560). If the value is not zero, processing branches to "No" branch 562, which loops back to wait for the next command cycle. This looping continues until column register 530's value is zero, at which point decision 560 branches to "Yes" branch 568.

At step 570, processing asserts the column command complete flag. The column command complete flag informs the activate allowed logic or subroutine that the last outstanding column command is complete, and, therefore, a new activate command may be issued at any time.

A determination is made as to whether processing should continue (decision 580). If processing should continue, decision 580 branches to "Yes" branch 582, which loops back to wait for another column counter request. This looping continues until processing should terminate, at which point decision 580 branches to "No" branch 588 whereupon processing ends at 590.

Figure 6:
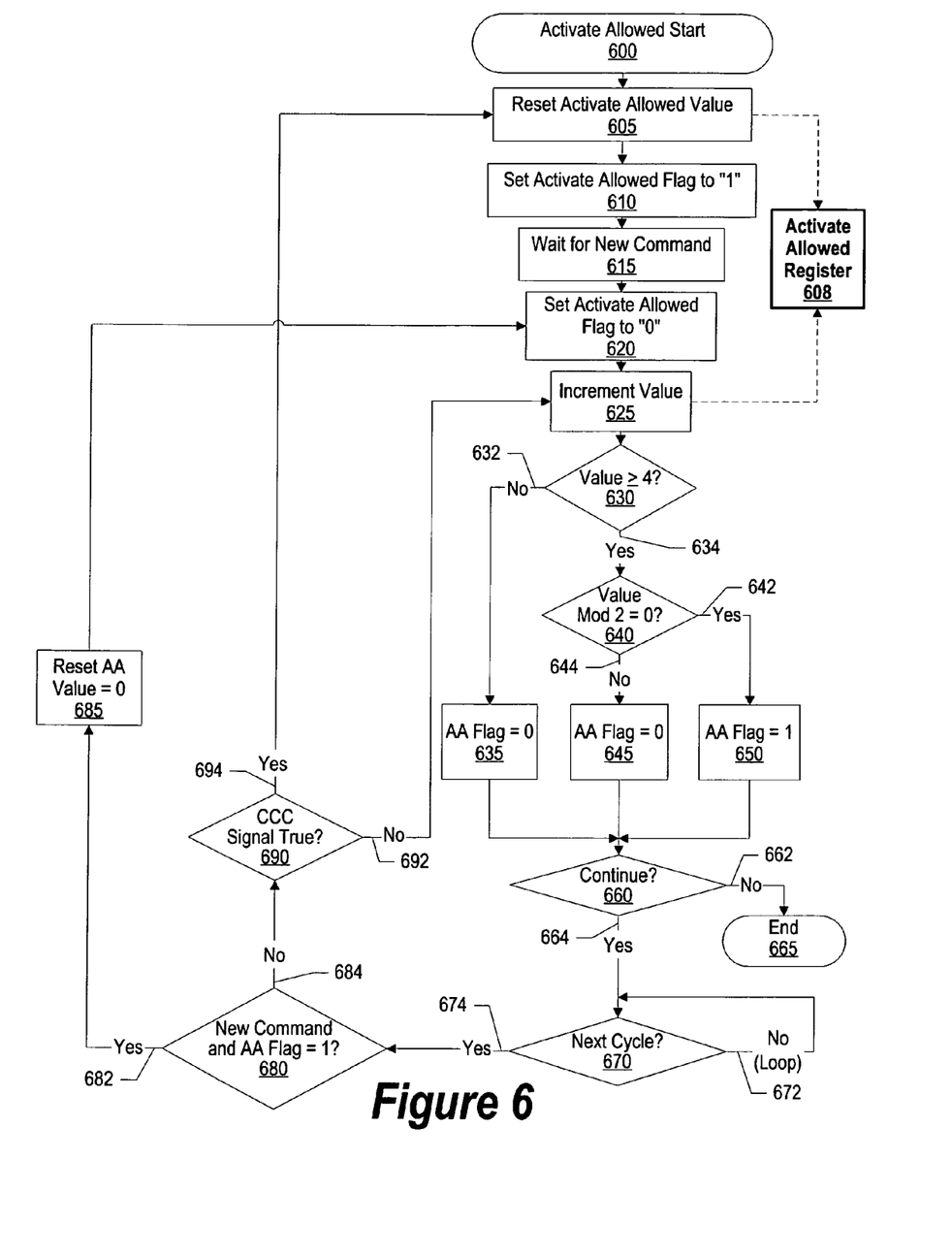
FIG. 6 is a flowchart showing steps taken in determining when a new activate command may be issued.

FIG. 6 is a flowchart showing steps taken in determining when a new activate command may be issued. Processing commences at 600, whereupon processing resets activate allowed register 608 to zero (step 605). Processing uses activate allowed register 608 to count command cycles relative to a new activate command, and may be stored in a volatile area, such as computer memory.

At step 610, processing sets the activate allowed flag to "1." Processing uses the activate allowed flag to signify that a new activate command may be issued. For example, if the flag value is "1," then processing may issue a new activate command. Processing waits for a new activate command at step 615. When processing receives a new activate command, processing sets the activate allowed flag to "0" at step 620, signifying that a second activate command may not be issued at this time.

Processing increments the value in activate allowed register 608 at step 625, and a determination is made as to whether the value of activate allowed register 608 is greater than or equal to the row activate to row activate to different bank's timing parameter ($t_{rr}$) (decision 630). The $t_{rr}$ parameter keeps the activate commands from issuing too close together. The example shown in FIG. 4 shows that the value of trr is "4." As one skilled in the art can appreciate, values other than four may be used for the $t_{rr}$ parameter.

If the value of activate allowed register 608 is not greater than or equal to $t_{rr}$, decision 630 branches to "No" branch 632, keeping the activate allowed flag set at zero (step 635).

On the other hand, if the value in activate allowed register 608 is greater than or equal to $t_{rr}$, decision 630 branches to "Yes" branch 634. A determination is made as to whether the value of activate allowed register 608 is exactly divisible by two (decision 640). When the value of activate allowed register 608 is exactly divisible by two, this signifies that the command cycle is an "even" command cycle relative to the time at which the activate command was issued. If the value of activate allowed register 608 is exactly divisible by 2, decision 640 branches to "Yes" branch 642 whereupon the activate allowed flag is set to "1," signifying that a new activate command may be issued (step 650). On the other hand, if the value of activate allowed register 608 is not exactly divisible by two, decision 640 branches to "No" branch 644 whereupon the activate allowed flag is kept at "0" (step 645).

A determination is made as to whether to continue processing (decision 660). If processing should terminate, decision 660 branches to "No" branch 662 whereupon processing ends at 665. On the other hand, if processing should continue, decision 660 branches to "Yes" branch 664 whereupon a determination is made as to whether a next command cycle occurs (decision 670). If a next command cycle does not occur, decision 670 branches to "No" branch 672 whereupon processing loops back to wait for the next command cycle. This looping continues until a next command cycle occurs, at which point decision 670 branches to "Yes" branch 674.

A determination is made as to whether processing receives a new activate command and the activate allowed flag is "1" (decision 680). If processing receives a new activate command and the activate allowed flag is "1," decision 680 branches to "Yes" branch 682 whereupon processing resets the value in activate allowed register 608 (step 685), and sets the activate allowed flag to "0." On the other hand, if processing does not receive a new activate command or the activate allowed flag is not "1," processing branches to "No" branch 684.

A determination is made as to whether a column commands complete signal is true (decision 690). The column commands complete signal is provided by last column counter logic 130 (shown in FIG. 1), or may be provided by a corresponding subroutine, whose steps are shown in FIG. 5. When the column commands complete signal is true, this signifies that the last column command that corresponds to an activate command is complete, and a new activate command may be issued at any time. If the column commands complete signal is true, decision 690 branches to "Yes" branch 694 whereupon processing resets the value of activate allowed register 608, sets the activate allowed flag to "1," and waits for a new activate command. On the other hand, if the column command complete signal is not true, decision 690 branches to "No" branch 692 whereupon processing increments the value of activate allowed register 608, and analyzes the incremented value as to whether to allow a new activate command.

Figure 7:
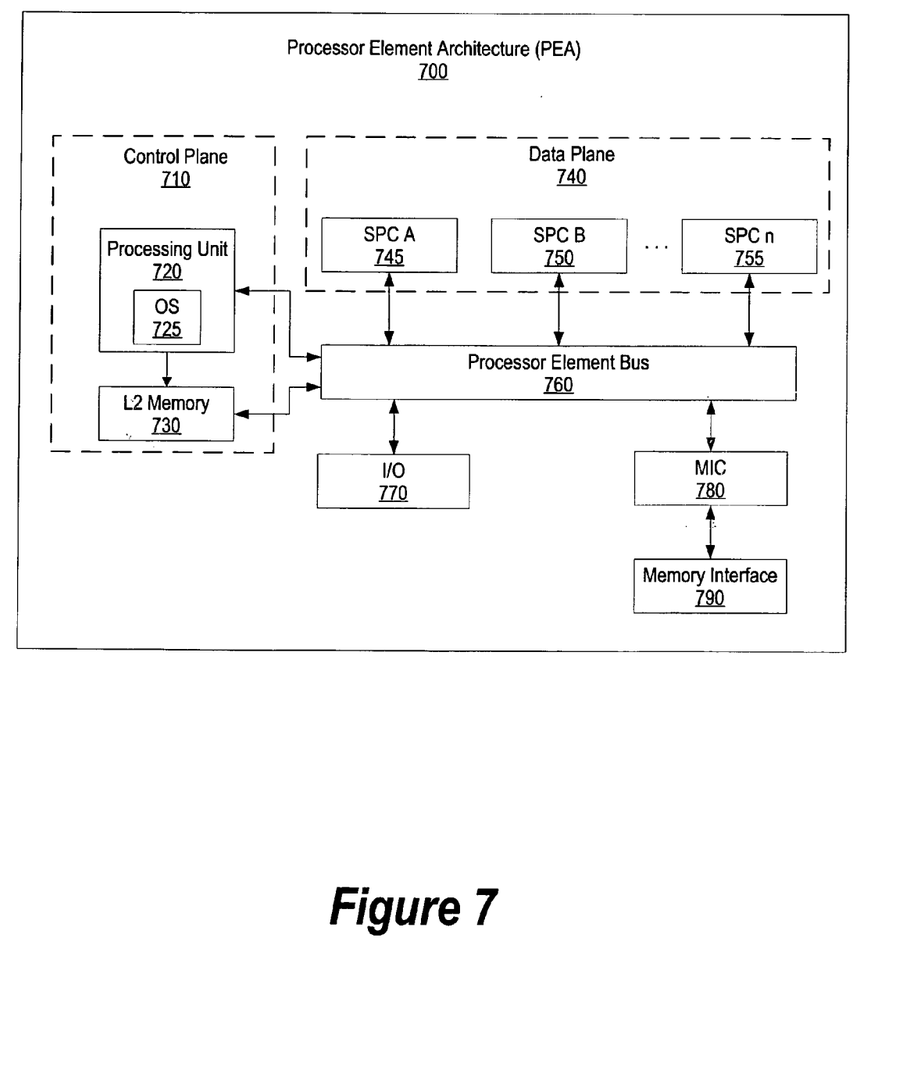
FIG. 7 is a block diagram of a computing device capable of implementing the present invention.

FIG. 7 is a block diagram of a computing device capable of implementing the present invention. The architecture shown in FIG. 7 includes heterogeneous processors that share a common memory and a common bus. Processor element architecture (PEA) 700 sends and receives information to/from external devices through input output 770, and distributes the information to control plane 710 and data plane 740 using processor element bus 760. Control plane 710 manages PEA 700 and distributes work to data plane 740.

In addition, processor element bus 760 provides read and write requests to memory interface controller (MIC) 780. Memory interface controller 780 communicates the requests to memory interface 790 that, in turn, communicates with external memory. In one embodiment, the memory may be extreme Data Rate (XDR™) DRAM, and, in this embodiment, memory interface 790 is an XIO™ interface that communicates with the XDR™ DRAM.

Control plane 710 includes processing unit 720, which runs operating system (OS) 725. For example, processing unit 720 may be a Power PC core that is embedded in PEA 700 and OS 725 may be a Linux operating system. Processing unit 720 manages a common memory map table for PEA 700. The memory map table corresponds to memory locations included in PEA 700, such as L2 memory 730 as well as non-private memory included in data plane 740.

Data plane 740 includes Synergistic Processing Complexes (SPC) 745, 750, and 755. Each SPC is used to process data information and each SPC may have different instruction sets. For example, PEA 700 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU), which is a processing core, such as a digital signal processor, a microcontroller, a microprocessor, or a combination of these cores.

SPC 745, 750, and 755 are connected to processor element bus 760, which passes information between control plane 710, data plane 740, and input/output 770. Bus 760 is an on-chip coherent multi-processor bus. Input/output 770 includes flexible input-output logic, which dynamically assigns interface pins to input-output controllers based upon peripheral devices that are connected to PEA 700. For example, PEA 700 may be connected to two peripheral devices, such as peripheral A and peripheral B, whereby each peripheral connects to a particular number of input and output pins on PEA 700. In this example, the flexible input-output logic is configured to route PEA 700's external input and output pins that are connected to peripheral A to a first input-output controller and route PEA 700's external input and output pins that are connected to peripheral B to a second input-output controller.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A system comprising:
    a memory;
    a memory controller with collision avoidance logic effective to:
        provide a new command load value that corresponds to a first activate command; and
        identify a command cycle to allow a second activate command based upon the new command load value, wherein the identified command cycle occurs only on an even command cycle relative to the first activate command at a point in time prior to the completion of a last column command corresponding to the first activate command;
    wherein the collision avoidance logic includes activate allowed logic that allows a second activate command during the identified command cycle, the identified command cycle occurring at the point in time prior to the completion of a last column command corresponding to the first activate command; and
    wherein the memory controller is further effective to issue a column command only on odd command cycles relative to the first activate command, wherein the even command cycles and the odd command cycles occur at points in time prior to the completion of the last column command corresponding to the first activate command.

2. The system of claim 1 wherein the collision avoidance logic is further effective to provide a read count value or a write count value, the system further comprising:
    last column counter logic effective to receive the read count value or the write count value and issue a last column command complete signal based upon the read count value or the write count value.

3. The system of claim 2 wherein the last column counter logic includes one or more registers that store the read count value or the write count value.

4. The system of claim 3 wherein the last column counter logic further includes one or more decrementers connected to the registers that decrement the read count value or the write count value on each command cycle.

5. The system of claim 2 wherein the last column command complete signal coincides with the last column command corresponding to the first activate command, the last column command complete signal occurring at a point in time after the identified command cycle.

6. The system of claim 2 wherein the collision avoidance logic is further effective to allow the second activate command in response to detecting the issued last column command complete signal.

7. The system of claim 1 wherein the collision avoidance logic includes a shift register that stores the new command load value.

8. The system of claim 7 wherein the shift register shifts the new command load value on each command cycle.

9. The system of claim 1 wherein the collision avoidance logic is further effective to issue an activate allowed signal that signifies that the second activate command is allowable.

10. The system of claim 1 wherein the first activate command and the second activate command correspond to an extreme data rate DRAM interface.

11. The system of claim 1 wherein the memory controller is included in a processing element architecture.

12. A computer-implemented method comprising:
    receiving a new command load value that corresponds to a first activate command;
    determining when to allow a second activate command based upon the new command load value, wherein the second activate command is allowed to occur only on even command cycles relative to the first activate command at a point in time prior to the completion of a last column command corresponding to the first activate command;
    setting an activate allowed flag in response to the determination, the activate allowed flag set prior to the completion of a last column command corresponding to the first activate command;
    issuing a column command only on odd command cycles relative to the first activate command; and
    wherein the even command cycles and the odd command cycles occur at points in time prior to the completion of the last column command corresponding to the first activate command.

13. The method of claim 12 further comprising:
    receiving a count value that corresponds to the first activate command;
    decrementing the count value;
    determining whether the count value is zero based upon the decrementing; and
    setting a last column command complete flag in response to the determination.

14. The method of claim 13 wherein the last column command complete flag coincides with the last column command corresponding to the first activate command, the last column command complete flag occurring at a point in time after the second activate command.

15. The method of claim 13 wherein the activate allowed flag is set in response to detecting that the last column command complete flag is set.

16. The method of claim 12 further comprising:
    detecting that the activate allowed flag is set; and
    issuing the second activate command in response to the detecting.

17. The method of claim 12 wherein the determining further comprises:
    detecting a new command cycle;
    incrementing the new command load value in response to the detecting; and evaluating whether the incremented new command load value is greater than four based upon the incrementing.

18. The method of claim 17 further comprising:
dividing the incremented new command load value by two; and
determining whether the dividing results in a remainder.

19. A program product comprising:
a computer storage medium having computer readable code, the computer readable code being effective to:
receive a new command load value that corresponds to a first activate command;
determine when to allow a second activate command based upon the new command load value, wherein the second activate command is allowed to occur only on even command cycles relative to the first activate command at a point in time prior to the completion of a last column command corresponding to the first activate command;
set an activate allowed flag in response to the determination, the activate allowed flag set prior to the completion of a last column command corresponding to the first activate command;
issue a column command only on odd command cycles relative to the first activate command; and
wherein the even command cycles and the odd command cycles occur at points in time prior to the completion of the last column command corresponding to the first activate command.

20. The program product of claim 19 wherein the computer readable code is further effective to:
receive a count value that corresponds to the first activate command;
decrement the count value;
determine whether the count value is zero based upon the decrementing; and
set a last column command complete flag in response to the determination.

21. The program product of claim 20 wherein the last column command complete flag coincides with the last column command corresponding to the first activate command, the last column command complete flag occurring at a point in time after the second activate command.

22. The program product of claim 20 wherein the activate allowed flag is set in response to detecting that the last column command complete flag is set.

23. The program product of claim 19 wherein the computer readable code is further effective to:
detect that the activate allowed flag is set; and
issue a second activate command in response to the detecting.

24. The program product of claim 19 wherein the computer readable code is further effective to:
detect a new command cycle;
increment the new command load value in response to the detection; and
evaluate whether the incremented new command load value is greater than four in response to the incrementing.

25. The program product of claim 24 wherein the computer readable code is further effective to:
divide the incremented new command load value by two; and
determine whether the dividing results in a remainder.

* * * * *